US006825950B1

(12) United States Patent
Inagaki

(10) Patent No.: US 6,825,950 B1
(45) Date of Patent: Nov. 30, 2004

(54) IMAGE REPRODUCTION APPARATUS, CONTROL METHOD THEREOF, PRINTING INFORMATION GENERATION METHOD, AND STORAGE MEDIUM

(75) Inventor: Atsushi Inagaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/542,342

(22) Filed: Apr. 5, 2000

(30) Foreign Application Priority Data

Apr. 9, 1999 (JP) .......................................... 11-102644

(51) Int. Cl.[7] .............................................. G06F 15/00

(52) U.S. Cl. ........................ 358/1.2; 358/1.15; 358/1.18

(58) Field of Search ................................ 358/1.2, 1.15, 358/1.18, 1.1, 1.16, 487, 478, 1.13, 1.14, 448, 408, 434, 468; 399/84; 235/437, 462.01

(56) References Cited

U.S. PATENT DOCUMENTS

| 5,335,093 A | * | 8/1994 | Imoto ......................... 358/487 |
| 5,757,418 A | | 5/1998 | Inagaki .................... 348/14.07 |
| 5,790,767 A | * | 8/1998 | Nishihara et al. .......... 358/1.16 |
| 6,151,445 A | * | 11/2000 | Nishimura .................. 386/130 |

* cited by examiner

Primary Examiner—Twyler Lamb
(74) Attorney, Agent, or Firm—Fitzpatrick, Cella, Harper & Scinto

(57) ABSTRACT

An image reproduction apparatus which can omit an operation to add specific information such as rotation information of an image when printing is ordered is provided. In the image reproduction apparatus, when printing order information necessary to print the image selected from among the images stored in storage media is generated, additional information of the selected image is read by a system control circuit. Then, when the rotation information of the image is included in the additional information of the read image, the rotation information is added to the printing order information.

18 Claims, 6 Drawing Sheets

| FIG. 1A | FIG. 1B |

FIG. 3

IMAGE ORDER    30

101-0102    SET ORDER

IMAGE REPRODUCTION APPARATUS, CONTROL METHOD THEREOF, PRINTING INFORMATION GENERATION METHOD, AND STORAGE MEDIUM

BACKGROUND OF THE INVENTION

1. Field of the Invention

The present invention relates to an image reproduction apparatus which reproduces an image recorded in a recording medium, a control method of the image reproduction apparatus, and a printing information generation method by which printing information necessary to print an image is generated.

2. Related Background Art

Conventionally, an image processing apparatus such as an electron camera or the like which takes, records and reproduces a still image and a moving image by using as a recording medium a memory card having a solid-state memory element has been commercially available. Besides, an electron camera which has an electronic finder composed of a color liquid crystal panel or the like has been commercially available.

These electron cameras can reproduce the image recorded in the memory card. Thus, as an operator watches the reproduced image, he can delete it, form a printing order file, and record the formed file in the memory card.

Further, for example, by adding rotation information of the image as additional information thereof, such the image can be rotationally displayed when it is reproduced. Thus, the operator can watch the image always at a normal position without rotating a display unit.

Further, when the rotation information is described in the printing order file, the image can be rotated when it is printed.

However, in such a conventional image reproduction apparatus as above, when the printing order file is formed, it is necessary to add the rotation information for the printing order independently of the rotation information used as the additional information of the image. Thus, there was a problem that the operation of the printing order is annoyed for the operator.

SUMMARY OF THE INVENTION

An object of the present invention is to solve the entirety or at least the part of the above-described problem.

Another object of the present invention is to be able to simply generate printing information which is used when an image is printed.

Still another object of the present invention is to provide an image reproduction apparatus which can omit an operation to add specific information such as rotation information of an image when printing information is generated, a control method for the image reproduction apparatus, a printing information generation method, and a storage medium.

Under the above-described objects, according to the preferred embodiment of the present invention, there is disclosed an image reproduction apparatus comprising:

an additional information reading means for reading additional information of an image stored in a storage medium;

a printing information generation means for generating printing information necessary to print the image stored in the storage medium; and an image selection means for selecting, from among the images stored in the storage medium, the image for which the printing information is to be generated, wherein, in a case where specific additional information is included in the additional information read by the additional information reading means, the printing information generation means records the specific additional information in the printing information.

Further, the image reproduction apparatus and the method of controlling the image reproduction apparatus are structured as follows.

(1) In the image reproduction apparatus, the additional information reading means for reading the additional information of the image stored in the storage medium, the printing information generation means for generating the printing information necessary to print the image stored in the storage medium, and the image selection means for selecting from among the images stored in the storage medium the image for which the printing information is to be generated are provided. When the printing information of the image selected by the image selection means is generated, the additional information of the selected image is read by the additional information reading means. When the read additional information includes the specific additional information, such the specific additional information is added to the printing information.

(2) In the image reproduction apparatus of (1), the specific additional information is rotation information of the image. Thus, such the rotation information is added as rotation information of the printing information.

(3) In the method of controlling the image reproduction apparatus, when printing information necessary to print an image selected from among images stored in a storage medium is generated, additional information of the selected image is read. When the read additional information includes specific additional information, such the specific additional information is added to the printing information.

(4) In the method of (3), the specific additional information is rotation information of the image. Thus, such the rotation information is added as rotation information of the printing information.

Other objects and features of the present invention will become apparent from the following detailed description and the attached drawings.

BRIEF DESCRIPTION OF THE DRAWINGS

FIG. 3 is a view showing an image selection screen according to the embodiment of the present invention;

DETAILED DESCRIPTION OF PREFERRED EMBODIMENT

Hereinafter, the embodiment of the present invention will be explained with reference to the attached drawings.

Figures 1, 1A:
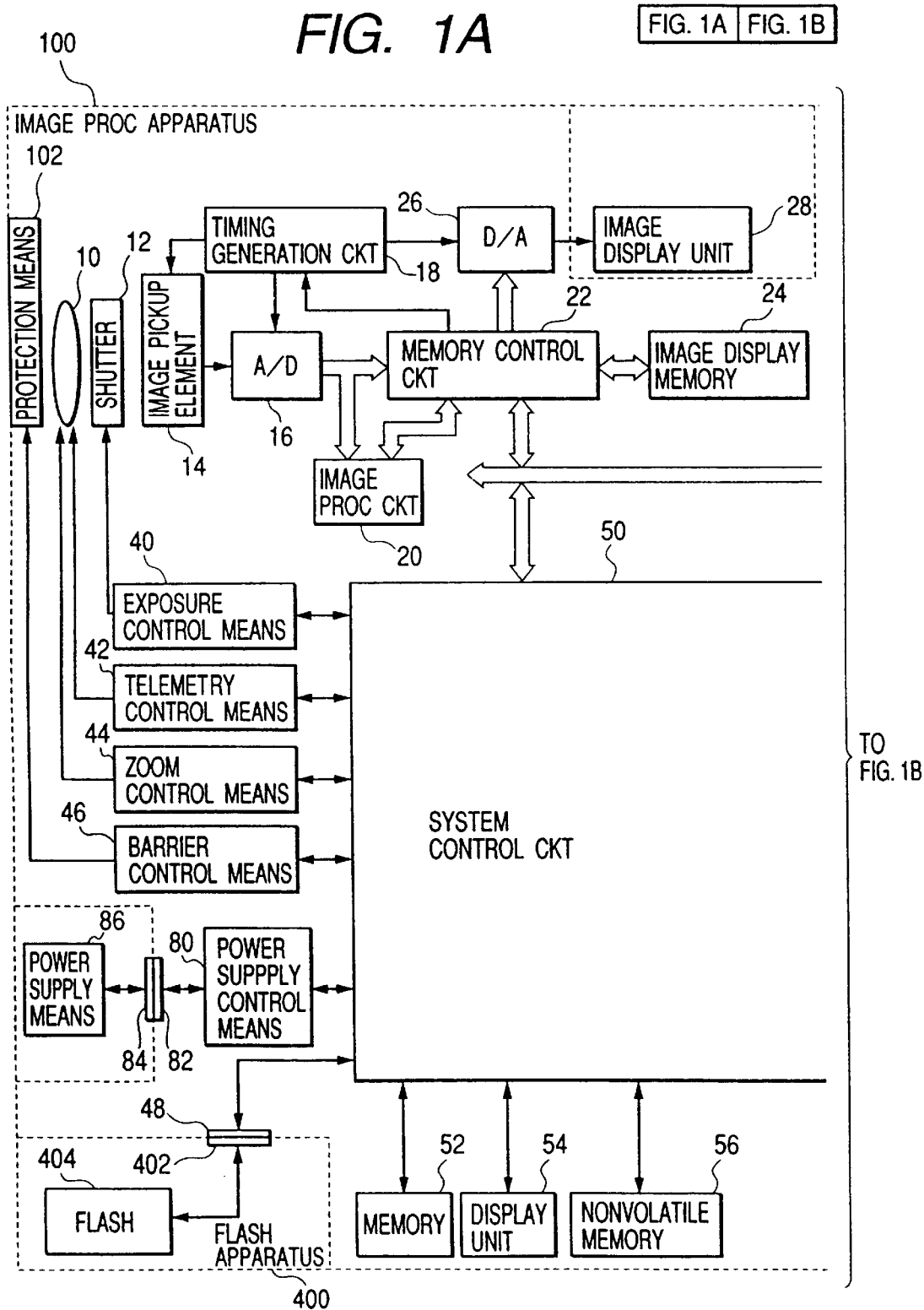
FIG. 1 which is composed of FIGS. 1A and 1B is a block diagram showing a structure of an image processing apparatus according to the embodiment of the present invention.
Figure 1B:
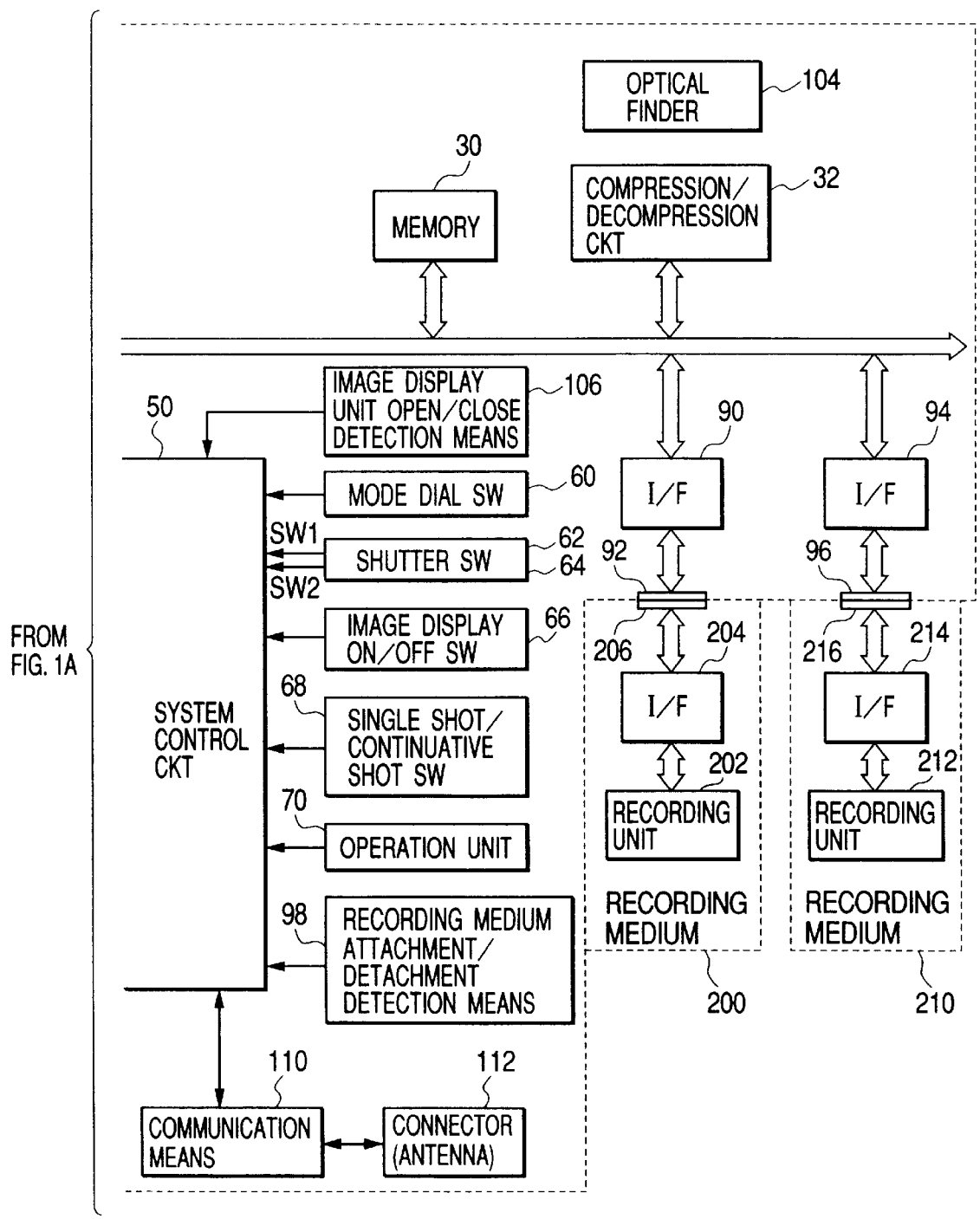

FIG. 1 which is composed of FIGS. 1A and 1B is a block diagram showing a structure of an image processing apparatus according to the present embodiment.

In FIGS. 1A and 1B, numeral 100 denotes an image processing apparatus.

Numeral 10 denotes a photographic lens, numeral 12 denotes a shutter which has a diaphragm function, numeral 14 denotes an image pickup element which converts an optical image into an electrical signal, and numeral 16 denotes an A/D converter which converts an analog signal output of the image pickup element 14 into a digital signal.

Numeral 18 denotes a timing generation circuit which supplies clock signals and control signals respectively to the image pickup element 14, the A/D converter 16 and a D/A converter 26. The timing generation circuit 18 is controlled by a memory control circuit 22 and a system control circuit 50.

Numeral 20 denotes an image processing circuit which performs predetermined pixel interpolation processing and color conversion processing to data sent from the A/D converter 16 or data sent from the memory control circuit 22.

Besides, the image processing circuit 20 performs predetermined calculation processing to the image data obtained by photographing the image. Thus, on the basis of the calculated result, the system control circuit 50 controls an exposure control means 40 and a telemeter control means 42. Concretely, the system control circuit 50 performs AF (autofocus) processing of TTL (through-the-lens) system, AE (automatic exposure) processing and EF (preflash) processing.

Further, the image processing circuit 20 performs predetermined calculation processing to the image data obtained by photographing the image. Thus, on the basis of the calculated result, the circuit 20 performs AWB (auto white balance) processing of TTL system.

Numeral 22 denotes the memory control circuit which controls the A/D converter 16, the timing generation circuit 18, the image processing circuit 20, an image display memory 24, the D/A converter 26, a memory 30 and a compression/decompression circuit 32.

The data from the A/D converter 16 is written in the image display memory 24 or the memory 30, through the image processing circuit 20 and the memory control circuit 22. Alternatively, the data from the A/D converter 16 is written in the image display memory 24 or the memory 30 directly through the memory control circuit 22.

Numeral 24 denotes the image display memory, numeral 26 denotes the D/A converter, and numeral 28 denotes an image display unit which is composed of a TFTLCD (thin film transistor liquid crystal display) or the like. The display image data written in the image display memory 24 is displayed by the image display unit 28 through the D/A converter 26.

When the obtained image data is serially displayed on the image display unit 28, it is possible to realize an electronic finder function.

Further, the image display unit 28 can arbitrarily turn on/off the display in response to the instruction of the system control circuit 50. When the image display unit 28 turns off the display, power consumption of the image processing apparatus 100 can be remarkably reduced.

Further, the image display unit 28 is connected to the body of the image processing apparatus 100 by means of a rotatable hinge unit. Thus, a user can use the electronic finder function, a reproduction display function and various display functions by freely setting a direction and an angle of the image display unit 28.

Further, the display part of the image display unit 28 is retractable such that this part faces toward the image processing apparatus 100. When an image display unit open/close detection means 106 detects such a holding state, the display operation of the image display unit 28 can be stopped.

Numeral 30 denotes the memory which stores static and moving images obtained by the photographing. Thus, the memory 30 has a capacity which is sufficient to store the static images of the predetermined number and the moving image of a predetermined time.

Therefore, even if continuative photographing (or continuative shot) to continuously photograph the plural static images and panoramic photographing are performed, high-speed and heavy image writing can be performed to the memory 30.

The memory 30 can be also used as a working area of the system control circuit 50.

Numeral 32 denotes the compression/decompression circuit which compresses and decompresses the image data according to ADCT (adaptive discrete cosine transform) or the like. Concretely, the compression/decompression circuit 32 first reads the image data from the memory 30, compresses or decompresses the read image data, and then writes the processed image data in the memory 30.

Numeral 40 denotes the exposure control means which controls the shutter 12 having the diaphragm function. When the exposure control means 40 cooperates with a flash 404, the exposure control means 40 also has a flash dimmer function.

Numeral 42 denotes the telemeter control means which controls focusing of the photographic lens 10.

The exposure control means 40 and the telemeter control means 42 are controlled according to the TTL system. Concretely, the system control circuit 50 controls the exposure control means 40 and the telemeter control means 42 on the basis of the result obtained by calculating the photographed image data with the image processing circuit 20.

Numeral 44 denotes a zoom control means which controls zooming of the photographic lens 10, and numeral 46 denotes a barrier control means which controls an operation of a protection means 102 acting as a barrier.

Numeral 48 denotes a connector which is also called an accessory shoe. The connector 48 includes an electrical contact with a flash apparatus 400 and also a mechanical fixing means to the apparatus 400.

Numeral 50 denotes the system control circuit which controls the image processing apparatus 100 as a whole. Numeral 52 denotes a memory which stores constants, variations, programs and the like for the operation of the system control circuit 50.

Numeral 54 denotes a display unit which is composed of an LCD (liquid crystal display), an LED, a speaker, a sound generation element and the like. The single or plural display units 54 are disposed at easy-visual locations in the vicinity of the image processing apparatus 100, and display an operation state, a message and the like by using characters, images, voices (audio) and the like, in accordance with execution of the programs by the system control circuit 50.

Further, a partial function of the display unit 54 is included in an optical finder 104.

For example, the LCD of the image display unit 54 displays "single shot/continuative shot", "self-timer", "compression ratio", "the number of recording pixels", "the number of recording", "remaining photographable number", "shutter speed", "diaphragm value", "exposure correction", "flash", "red-eye reduction", "macro shot", "buzzer setting", "remaining timer battery amount", "remaining battery amount", "error", "information (represented by plural digits)", "attachment/detachment state (of recording media 200 and 210)", "operation of communication I/F", "date and time", and the like.

Further, for example, the optical finder 104 of the image display unit 54 displays "focus", "shakiness warning", "flash charge", "shutter speed", "diaphragm value", "exposure correction", and the like.

Numeral 56 denotes a nonvolatile memory which is electrically erasable and recordable. For example, an EEPROM (electrically erasable, programmable read-only memory) or the like is used as the nonvolatile memory 56.

Numerals 60, 62, 64, 66, 68 and 70 together denote an operation means which is used to input various operation instructions for the system control circuit 50. The operation means consists of a single or plural combinations of a switch, a dial, a touch panel, a view-detection pointing device, a voice recognition device and the like.

Hereinafter, the operation means will be concretely explained.

Numeral 60 denotes a mode dial switch which can change and set each of a power off mode, an automatic photographing mode, a photographing mode, a panoramic photographing mode, a reproduction (replay) mode, a multiscreen reproduction and deletion mode, a PC (personal computer) connection mode and the like.

Numeral 62 denotes a shutter switch (SW1) which is turned on while the user is operating a not-shown shutter button. The shutter switch 62 is used to instruct to start the AF (autofocus) processing, the AE (automatic exposure) processing, the AWB (auto white balance) processing, the EF (preflash) processing and the like.

Numeral 64 denotes a shutter switch (SW2) which is turned on when the user completes the operation of the not-shown shutter button. The shutter switch 64 is used to instruct to start serial processing which includes exposure processing, development processing and recording processing. In the exposure processing, the signal read from the image pickup element 14 is converted into the image data by the A/D converter 16, and the obtained image data is written in the memory 30 through the memory control circuit 22. In the development processing, the image data is subjected to the calculation by using the image processing circuit 20 and the memory control circuit 22. In the recording processing, the image data read from the memory 30 is compressed by the compression/decompression circuit 32, and the compressed image data is written in the recording medium 200 or 210.

Numeral 66 denotes an image display ON/OFF switch which can set on and off states of the image display unit 28. By such a function, the supply of the power to the image display unit 28 composed of the TFTLCD and the like is interrupted when the photographing is performed by using the optical finder 104, thereby saving the power.

Numeral 68 denotes single shot/continuative shot switch which can alternatively set a single photographing (shot) mode and a continuative photographing (shot) mode. In the single photographing mode, when the shutter switch (SW2) 64 is depressed, the photographing of one frame is performed, and the image processing apparatus 100 is then on standby. In the continuative photographing mode, while the shutter switch (SW2) 64 is being depressed, the photographing is continued.

Numeral 70 denotes an operation unit which is composed of various buttons, a touch panel and the like. Concretely, the operation unit 70 includes a menu button, a setting button, a macro button, a multiscreen reproduction (replay) and page change button, a flash setting button, a single shot/continuative shot/self-timer change button, a menu shift "+" (plus sign) button, a menu shift "−" (minus sign) button, a reproduction image shift "+" (plus sign) button, a reproduction image shift "−" (minus sign) button, a photographing image quality selection button, an exposure correction button, a date/time setting button, a selection/change button which is used to select and change various functions when the photographing and the reproduction are performed in the panoramic mode or the like, a voice recording start button, a determination/execution button which is used to determine and execute the various functions when the photographing and the reproduction are performed in the panoramic mode or the like, an image display ON/OFF switch which is used to turn on/off the image display unit 28, a quick-review ON/OFF switch which is used to set a quick-review function for automatically reproducing the photographed image data immediately after the photographing, a compression mode switch which is used to select a CCDRAW mode for selecting a compression ratio in JPEG (Joint Photographic Experts Group) compression or for digitizing the signal from the image pickup element as it is and recording the digitized signal in the recording medium, a reproduction mode switch which is used to set various function modes (the reproduction mode, the multiscreen reproduction and deletion mode, the PC connection mode, etc.), a reproduction mode switch which is used to instruct to start a reproduction operation for reading the photographed image from the memory 30 or the recording medium 200 or 210 and then displaying the read image on the image display unit 28 in a photographing mode, a drive button which is used to change an active drive, a reproduction display change button which is used to change one-sheet display and plural-sheet display in the image reproduction, an information display button which is used to display additional information of the recording image, and the like.

Numeral 80 denotes a power supply control means which is composed of a battery detection circuit, a DC/DC converter, a switch circuit for changing a block to be energized, and the like. The power supply control means 80 detects presence/absence of a battery, a kind of battery, and a remaining battery amount, and controls the DC/DC converter on the basis of the detected result and instructions of the system control circuit 50, thereby supplying a necessary voltage to each unit including the recording medium for a necessary period.

Numeral 82 denotes a connector, numeral 84 denotes a connector, and numeral 86 denotes a power supply means which is composed of a primary battery (such as an alkaline cell, or a lithium cell), a secondary battery (such as an NiCd battery, an NiMH battery, or an Li battery), an AC adapter and the like.

Each of numerals 90 and 94 denotes an I/F (interface) which interfaces with the recording medium such as a memory card, a hard disk or the like. Each of numerals 92 and 96 denotes a connector which connects with the recording medium such as the memory card, the hard disk or the like. Numeral 98 denotes a recording medium attachment/detachment detection means which detects whether or not the recording media 200 and 210 have been respectively equipped for the connectors 92 and 96.

In the present embodiment, there are the two systems each composed of the I/F and the connector and to which the recording media are equipped. However, a single system and any number of systems can be of course provided. Further, a system in which different-standard I/F and connector are combined with each other can be provided.

Further, the I/F and the connector according to standards for a PCMCIA (Personal Computer Memory Card International Association) card, a CF (compact flash) card and the like may be used.

Further, in a case where the I/F 90, the I/F 94, the connector 92 and the connector 96 according to the standards for the PCMCIA card, the CF card and the like are used, when various communication cards such as a LAN card, a modem card, a communication card (such as a USB card, an IEEE1394 card, a P1284 card, a SCSI card, or a PHS communication card) and the like are connected to the image processing apparatus 100, the apparatus 100 can transmit/receive the image data and management data attached to the image data to/from other computers and peripheral devices such as a printer and the like.

Numeral 102 denotes the protection means which covers the image pickup unit including the photographic lens 10 of the image processing apparatus 100 to prevent the image pickup unit becoming dirty and being damaged.

Numeral 104 denotes the optical finder. The user can perform the photographing by using only the optical finder 104, i.e., without using the electronic finder function of the image display unit 28. Further, the user can execute, through the optical finder 104, parts of the functions of the image display unit 54, e.g., "focus", "shakiness warning", "flash charge", "shutter speed", "diaphragm value", "exposure correction", and the like.

Numeral 106 denotes the image display unit open/close detection means 106 which can detect whether or not the image display unit 28 is in the holding state that its display part has faced toward the image processing apparatus 100.

When the image display unit open/close detection means 106 detects that the image display unit 28 is in such the holding state as above, unnecessary power consumption can be inhibited by stopping the display operation of the image display unit 28.

Numeral 110 denotes a communication means which has various communication functions such as an RS232SC communication function, a USB communication function, an IEEE1394 communication function, a P1284 communication function, a SCSI communication function, a modem communication function, a LAN communication function, a wireless communication function, and the like.

Numeral 112 denotes a connector through which the image processing apparatus 100 is connected to another equipment by the communication means 110. In wireless communication, number 112 denotes an antenna.

Numeral 200 denotes the recording medium such as the memory card, the hard disk or the like.

The recording medium 200 is composed of a recording unit 202, an I/F 204 and a connector 206. The recording unit 202 consists of a semiconductor memory, a magnetic disk and the like. The I/F 204 interfaces with the image processing apparatus 100, and the connector 206 connects with the image processing apparatus 100.

Numeral 210 denotes the recording medium such as the memory card, the hard disk or the like.

The recording medium 210 is composed of a recording unit 212, an I/F 214 and a connector 216. The recording unit 212 consists of a semiconductor memory, a magnetic disk and the like. The I/F 214 interfaces with the image processing apparatus 100, and the connector 216 connects with the image processing apparatus 100.

Numeral 400 denotes the flash apparatus.

Numeral 402 denotes a connector by which the flash apparatus 400 connects with the accessory shoe of the image processing apparatus 100.

Numeral 404 denotes the flash which has a floodlight function for an AF fill light and the flash dimmer function.

In the above structure, the system control circuit 50 acts as an additional information reading means which reads additional information such as rotation information of the image stored in the recording medium 200 or 210, and also acts as a printing information generation means which generates printing order information (automatic printing information) necessary to print the image stored in the recording medium 200 or 210.

Further, the operation unit 70 acts as an image selection means which selects the image from which the printing information is generated, from among the images stored in the recording media 200 and 210.

Figure 2:
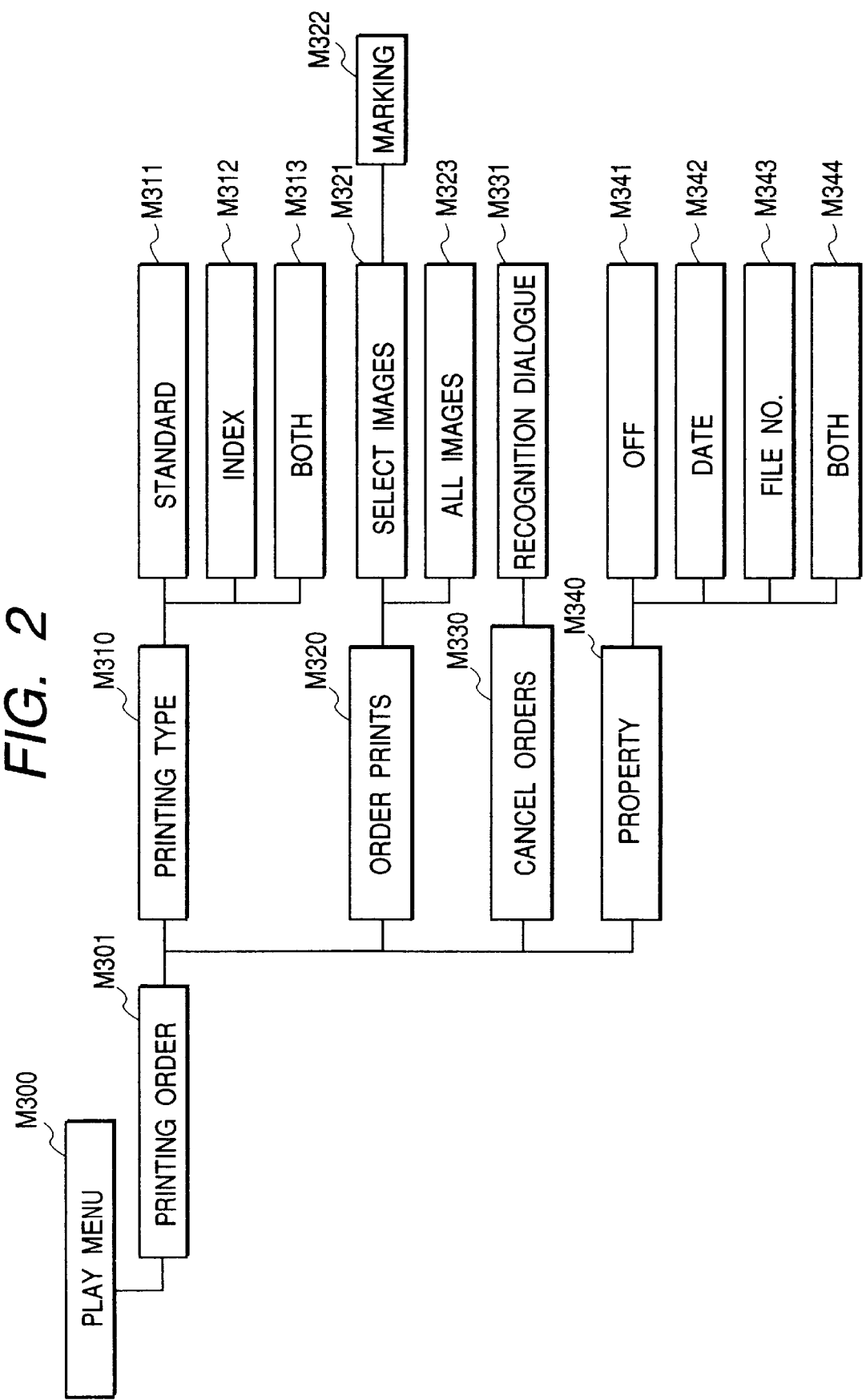
FIG. 2 is a block diagram showing a part of a menu structure according to the embodiment of the present invention.

FIG. 2 is a block diagram showing a part of a menu structure to generate a printing order according to the present embodiment.

Figure 3:
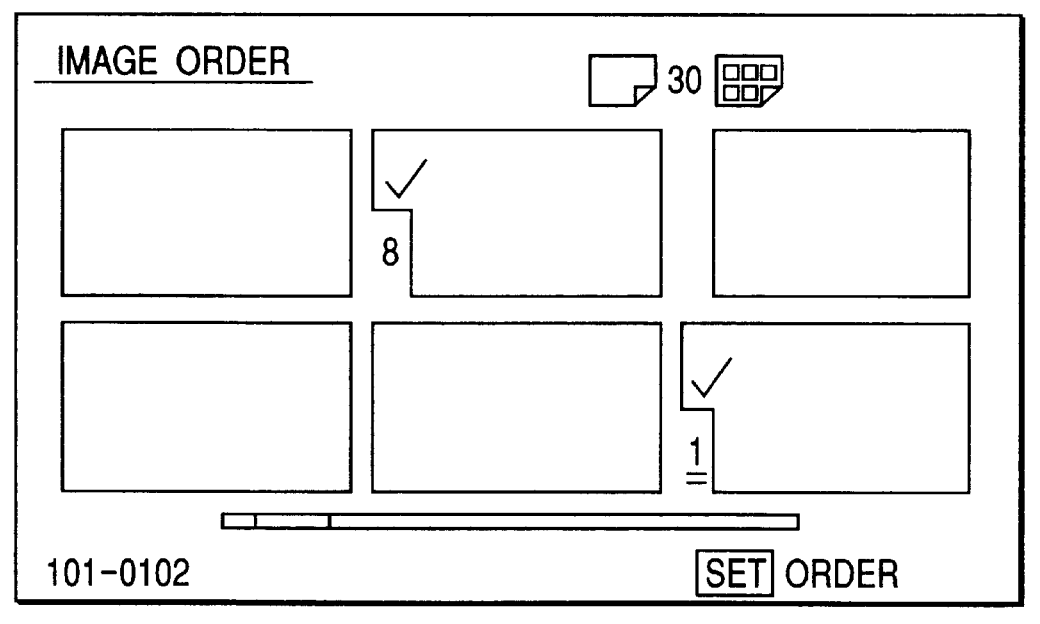

FIG. 3 is a view showing an image selection screen which is used to perform the printing order according to the present embodiment.

Figure 4:
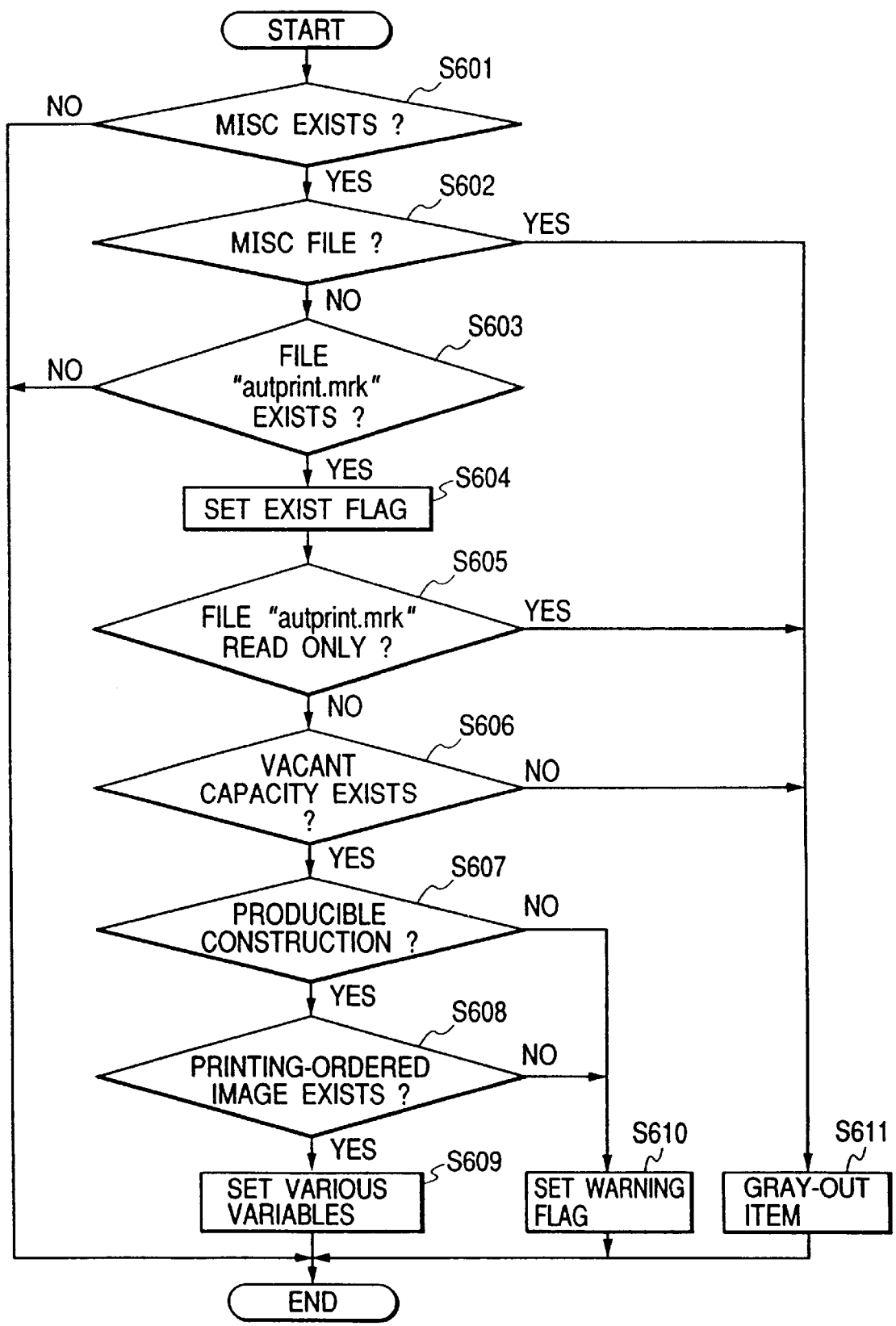
FIG. 4 is a flow chart of detection and analysis processing of printing order files according to the embodiment of the present invention.

FIG. 4 is a flow chart of detection and analysis processing (main routine) of printing order files existing in the recording media 200 and 210 according to the present embodiment. It should be noted that the above processing is performed on the basis of a program stored in the memory 52, according to instructions from the system control circuit 50.

Figure 5:
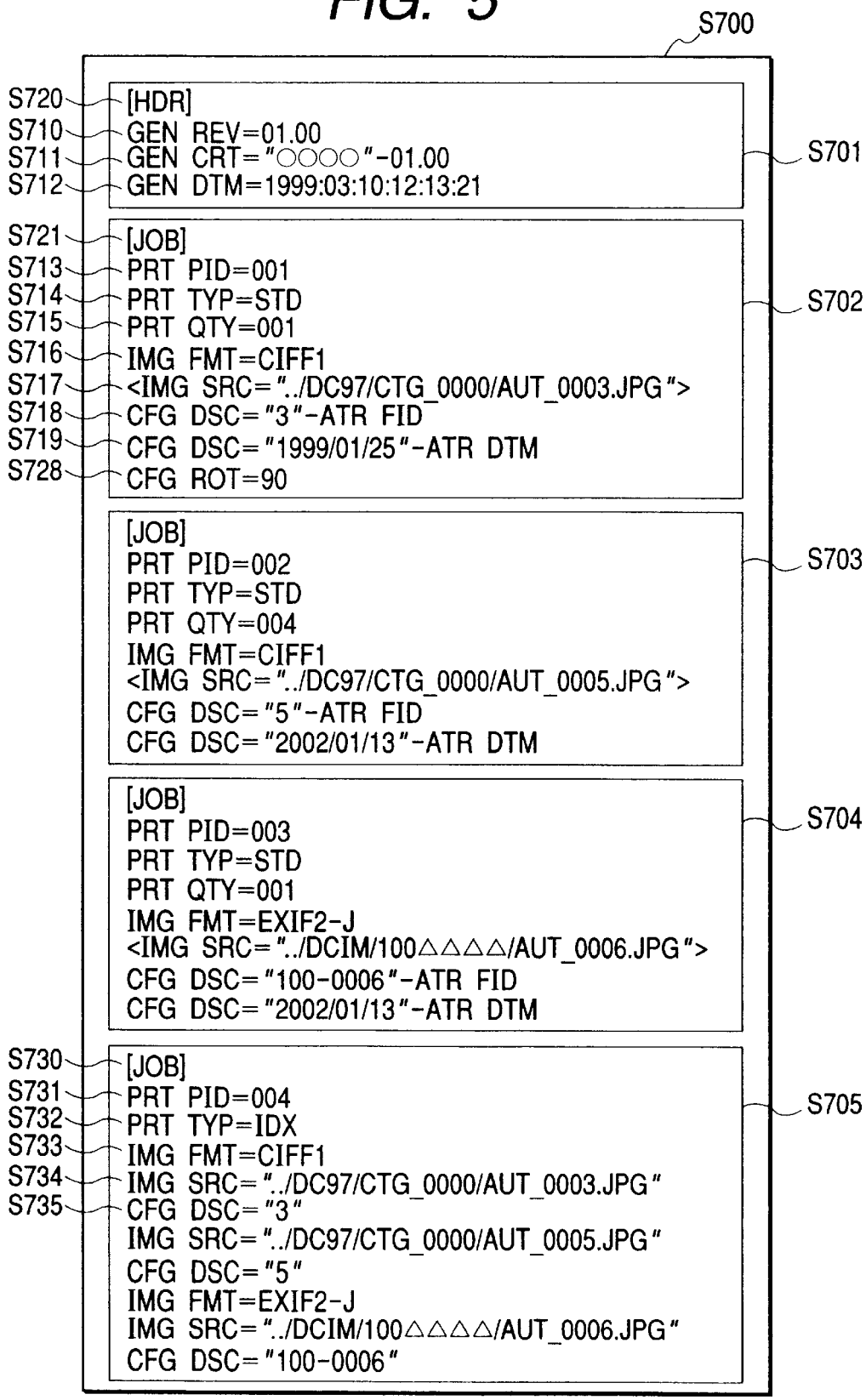
FIG. 5 is a view showing a structure of the printing order file according to the embodiment of the present invention.

FIG. 5 is a view showing a structure of the printing order file according to the present embodiment.

Hereinafter, an example of performing the printing order in the image processing apparatus will be explained with reference to FIGS. 2 to 5.

When the mode dial switch 60 is set to "PLAY", the reproduction (play) mode is started to analyze the printing order files in the recording media 200 and 210. First, a root directory of the recording media 200 and 210 is searched to judge whether or not a directory or a file named "MISC" exists (step S601). If judged that the directory or the file named "MISC" does not exist, then the analysis processing ends.

Conversely, if judged in the step S601 that the directory or the file named "MISC" exists, then it is judged whether "MISC" is the directory or the file (step S602). If judged that "MISC" is the file, then a printing order menu M301 in a play (reproduction) menu M300 is grayed out (step S611), and the processing ends. Conversely, if judged in the step S602 that "MISC" is the directory, then such the directory named "MISC" is retrieved or searched to judge whether or not a file named "autprint.mrk" (hereinafter called "autprint-.mrk" file) exists (step S603).

If judged that the "autprint.mrk" file does not exist, the processing ends. Conversely, if judged in the step S603 that the "autprint.mrk" file exists, an "EXIST" flag representing that the printing order file exists is set (step S604). Next, it is judged whether or not the attribute of the "autprint.mrk" file is dedicated to reading (read only) (step S605). Namely, it is judged whether or not the attribute of the "autprint.mrk" file is dedicated to writing inhibition.

If judged that the attribute of the "autprint.mrk" file is dedicated to reading, then the printing order menu M301 in the play menu M300 is grayed out (step S611), and the processing ends. Conversely, if judged in the step S605 that the "autprint.mrk" file is not dedicated to reading, i.e., that data writing can be performed in the "autprint.mrk" file, then it is judged whether or not vacant capacities of the recording media 200 and 210 are enough to write therein the printing order information of one sheet (step S606).

If judged that the vacant capacities of the recording media 200 and 210 are not enough to write therein the printing order information of one sheet, then the printing order menu M301 in the play menu M300 is grayed out (step S611), and the processing ends. In the present embodiment, when one item is gray-out displayed, such the item can not be selected from the menu. Conversely, if judged in the step S606 that the vacant capacities of the recording media 200 and 210 are enough to write therein the printing order information of at least one sheet, then the "autprint.mrk" file is analyzed.

Next, it is judged whether or not a construction described in the "autprint.mrk" file can be produced by the image processing apparatus 100 (step S607). If judged that such the construction can be produced by the apparatus 100, then it is judged whether or not the image which has been ordered to be printed (also called the printing-ordered image) exists in the recording medium 200 or 210 (step S608). If judged that the printing-ordered image exists, such the image is considered to be producible by the image processing apparatus 100. Thus, on the basis of the result of the file analysis, a printing type variable, an image information variable, a printing order variable, and a standard printing total number variable are set (step S609), and the processing ends.

In these variables, the printing type variable and the image information variable are set in the nonvolatile memory 56. Conversely, if judged in the step S607 that such the construction can not be produced by the apparatus 100, and if judged in the step S608 that the printing-ordered image does not exist, then a warning flag to be displayed on the printing order menu M301 is set (step S610), and the processing ends. After the above analysis ends, the images existing in the recording media 200 and 210 are reproduced by the image processing apparatus 100.

When the menu button of the operation unit 70 is depressed while the image is being reproduced, the play menu M300 is displayed on the image display unit 28. On the play menu M300, an item is shifted by depressing the "+" button of the operation unit 70, and the item is determined by depressing the "SET" button thereof. In a case where the item printing order in the play menu is to be displayed, when the "EXIST" flag has been set based on the above file analysis, a check icon (e.g., "✓") is displayed beside the item "printing order" to notify the user that the printing order file exists.

Further, when the warning flag is set in the step S610, a warning display icon "!" representing that the information is rewritten or replaced in the image processing apparatus 100 is displayed. When the "SET" button is depressed in the item "printing order", the printing order menu M301 is displayed.

When the printing order menu M301 is displayed, the printing type variable and the image information variable are captured from the nonvolatile memory 56, and a printing type menu M310 and a property (image information) menu M340 are set. Further, by referring to the printing order variable and the standard printing total number variable, an order prints (image order) menu M320 is displayed. In the printing order menu M301, the printing type menu M310, the order prints menu M320, a cancel orders menu M330 and the property menu M340 are provided as selectable items.

When the "SET" button is depressed in the printing type menu M310, a standard menu M311, an index menu M312 and a both menu M313 are provided as selectable items. At this time, when the "MENU" button is depressed, the selected item is cancelled, and the menu is returned to the printing order menu M301. Here, in the both menu M313, the printing orders in both the standard menu M311 and the index menu M312 are performed. Such values as above are set in the nonvolatile memory 56.

When the order prints menu M320 is selected, either one of a select images menu M321 and an all images menu M323 is selectable. When the select images menu M321 is selected, a marking mode menu M322 is displayed (see FIG. 3). When the all images menu M323 is selected, the printing order for all the images recorded in the recording media 200 and 210 is performed. At this time, when the number of printing images is limited due to the construction of the printing order, the number of images including the latest image is ordered, and e.g., an icon "✓" is displayed nearby the displayed printing number.

When the printing of all the images in the recording media 200 and 210 can not be ordered due to limitations of a remaining CF amount, an icon "✓" is displayed nearby the displayed printing number, and a message "CF CARD IS FULL" is displayed together with the warning display icon "!" at the lower part of the screen, thereby notifying the user of the reason why the order is impossible.

A marking mode will be explained with reference to FIG. 3. In the marking mode, following operations are performed.

(1) The image is shifted by using the buttons "+" and "−". Namely, a scroll bar is shifted left by using the button "−", while the scroll bar is shifted right by using the button "+".

(2) When the button "SET" is depressed, a printing order mark is added to the image in which the scroll bar exists, and the number of printing is set to "1".

(3) When the button "SET" is again depressed for the image to which the printing order mark was set, the mark is released.

(4) The number of printing is displayed below the check mark.

(5) The number of printing is increased by using the buttons "SET" and "+". In the present embodiment, it is possible to maximumly set the number "29" of printing for the image. In a case where the number "29" is being set, when the number is further increased, it is changed to "0".

(6) When the set number of printing reaches "10", the number is underlined in the screen. In this case, one underline represents the number "10".

(7) The number of printing is decreased by using the buttons "SET" and "−". When the number is set to "0", it represents that the printing order is released. In a case where the number "0" is being set, when the number is further decreased, it is changed to "29".

(8) When the ordered number of images exceeds the order possibility number, display of the button "SET" is grayed out, whereby more image order becomes impossible.

(9) The standard printing total number (right) is displayed at the upper right of the screen.

(10) When the printing order file includes the description corresponding to the predetermined number or more, the warning display icon "!" is displayed to notify the user of mass printing. However, such the display can be changed. Namely, when the button "SET " is depressed, the number of printing is released, and then the number of printing can be newly set.

(11) When the main image is formed in a data compression system other than a JPEG system, display of the button "SET" is grayed out to disable the printing order.

(12) When index printing is ordered, the number of printing is set to only "1", and any numeral is not displayed. Namely, only the check mark is displayed.

(13) when the "MENU" button is depressed, the menu is returned to the printing order menu M301.

When the cancel orders menu M330 is selected, a recognition dialogue menu M331 is displayed to release all the printing orders currently set. When the recognition dialogue menu M331 is cancelled, it is released, and the menu is returned to the printing order menu M301. Conversely, when the recognition dialogue menu M331 is selected, all the printing orders are released. Besides, if there is the printing order, it is deleted.

The property (image information) menu M340 in the printing order menu M301 is used to set character printing when the printing is performed. An off menu M341 is used not to order the character printing, a date menu M342 is used to order date printing, and a file number menu M343 is used to select the printing order for file numbers. On the basis of operations by using the menus M341, M342 and M343, a character to be printed together with the image is determined. A both menu M344 is used to order the printing of both date and file number.

The printing order information which is set according to the above ordering manner is stored as shown in FIG. 5.

In FIG. 5, symbol S700 denotes a printing order file acting as printing information. The printing order file S700 is composed of a header section S701, and job sections S702, S703, S704 and S705.

First, a tag S720 representing the header section is described. Next, after a description S710 representing a version of printing order construction is given, a description S711 representing a name of a device to which the file is described is given. Subsequently, a current time is taken from the system control circuit 50, and a description S712 representing the taken time is given. Thus, the description of the header section S701 ends.

After the description of the header section S701 ends, description of the printing order is performed (as the job section) according the above printing order. In the above operation to perform the printing order, when the image being the target of the printing order has been selected and the printing type is ordered as the standard printing, the job section S702 includes following descriptions.

First, a tag S721 representing the job section is described. Next, a job number description S713 representing printing sequence is given, and a description S714 is given according to the printing type order selected in the printing type menu M310. In the present embodiment, if the printing type is the standard printing, the description S714 is given as "STD", while if the type is the index printing, the description S714 is given as "IDX". Next, when the number of printing has been ordered in the marking mode, a description S715 representing such the ordered number is given.

Next, after a description S716 representing a format of the printing target image is given, a description S717 representing a file path of the printing image is given, and descriptions for the printing setting are given. In the present embodiment, a description S718 representing the file number printing order and a description S719 representing the date printing order are given.

Finally, the additional information of the printing-ordered image is read. When rotation has been added in the additional information, such the rotation information is automatically given as a description S728. For example, the rotation information in the additional information of the printing image is described as an orientation tag if the printing-ordered image file is based on an "EXIF" format. Concretely, when a description "90" is given, it orders to rotate the image clockwise by 90°.

In such the manner as described above, the job section S702 representing the standard printing job is described. The standard printing job description of the number of images ordered in the above printing order step is performed. When the index menu M312 and the both menu M313 are selected in the printing type menu M310, the job for the index printing is described.

The tag S705 in FIG. 5 shows an example when the index printing job is set. Like the standard printing job, the index printing job of the job section S705 includes a tag S730 declaring the job, a job number description S731 representing printing sequence, and a description S732 (IDX) ordering the index printing. Then, a description S733 representing a file format of the printing image is given.

Subsequently, a description S734 representing an image file path to which the printing is ordered is given, and a description S735 for setting image information printing based on the order of the menu M341 is given. However, in the index printing, only single-information printing is permitted due to a limitation on a printing space. Namely, either one of file number printing and date printing can be performed. Therefore, even if both the file number printing and the date printing are selected in the property (image information) menu M340, it is previously set to describe either one of them as the image information printing setting description S735. In the present embodiment, the file number printing is given as the description S735. As described above, when the description of all the printing order information ends on the basis of the user's operation, the above processing ends.

In a case where there are the plural images to which the index printing has been ordered, when the next image format is different from the immediate-before image format, the description is started from the file format description S733. Conversely, when the next image format is identical with the immediate-before image format, the description of the file format description S733 is omitted, and it is stared from the image file path description S734. As above, the index printing job description of the number of images ordered is performed, and the index printing job description S705 ends. When all the descriptions end, the printing order file description ends.

In a printing system which is composed of a reproduction apparatus according to the present embodiment and a printer, it is possible by using such printing order information as above to specify the image to be printed, to recognize a kind of printing and character information to be printed, and to rotate and print the image based on rotation information.

As described above, according to the present embodiment, since the rotation information in the additional information of the image is used as the rotation information when the printing is ordered, it is possible to omit the operation necessary to add the rotation information when the printing is ordered, thereby simplifying entire operations when the printing is ordered.

Further, since the rotation information is automatically input into the printing information, the user himself may forget to input the rotation information. For example, when a vertically photographed image and a horizontally photographed image mixedly exist in the index printing, it is possible to surely match top and bottom directions of the plural images and output the direction-matched images.

Such the operation is effective not only to the index printing but also to, e.g., normal printing. Concretely, the above operation is effective when a printing position of the character information such as date or the like is changed according to the rotation information.

Namely, the outputting is possible according to the vertically and horizontally photographed images without forgetting the input of the rotation information, while the position at which the character is printed is being changed.

Incidentally, it is possible to read the rotation information which has been recorded in the header of the image file itself when the image represented by such the image file is printed, and to utilize the read information for the printing. However, in a case where the rotation information has been previously recorded in the printing order file having the printing information, for example, when the index printing that the plural images are printed on the single sheet is performed, it is unnecessary to access all the image files to capture the rotation information every time the printing is performed. Namely, it is possible only by reading the printing order file to determine a layout including the rotation information, thereby increasing processing speed of the printer.

Further, when the specific additional information such as the rotation information or the like is not read, the specific additional information is not recorded in the printing information. Conversely, when the specific additional information is read, the read specific additional information is added to the printing information for the image selected by a selection means. Thus, as compared with the case where the information representing that the specific information does not exist (e.g., the information representing no rotation) is recorded, it is possible to reduce a data quantity.

Further, for example, when the index printing or the like is set, the printing is ordered for the plural (sometimes all) images recorded in the recording medium. In this case, it is not to order the printing while displaying the image, by accessing the image data and the additional information for each image. Namely, when the printing information is set, since the additional information for all the images is not necessarily read, it is preferable to read the additional information when the printing information is generated.

Further, in a case where a DPOF (digital printing order format) is applied as the format of the printing information, when the present invention is applied in a digital camera, a printer or the like, it is possible to exchange data to/from other apparatuses, thereby convenient. Further, in a case where a storage medium such as a memory card detachable from the body of the image processing apparatus is used, when the user finds that he forgot to input the additional information such as the rotation information or the like, there is a possibility that an appropriate device capable of storing the printing information in the storage medium is not in at hand of the user, and in such the case the user can not correct the information. Therefore, to apply the present invention to the case where the detachable storage medium is used is highly effective.

The present invention includes not only the apparatus which can set the printing information, but also a printing system which has a printer.

The present invention is not limited to the above described embodiment. Namely, the present invention can be variously modified without departing from the scope of the appended claims.

What is claimed is:

1. An image reproduction apparatus comprising:
   additional information reading means for reading additional information of an image stored in a storage medium;
   printing information generation means for generating printing information used for printing the image stored in the storage medium; and
   image selection means for selecting, from among the images stored in the storage medium, the image for which the printing information is to be generated,
   wherein, in a case where specific additional information is included in the additional information read by said additional information reading means, said printing information generation means sets the specific additional information in the printing information,
   in a case where the specific additional information is not read, said printing information generation means does not set the specific additional information, and
   in a case where the specific additional information is read, said printing information generation means adds the specific additional information to the printing information for the image selected by said image selection means.

2. An apparatus according to claim 1, wherein the specific additional information is rotation information of the image.

3. An apparatus according to claim 2, wherein the rotation information is information corresponding to a vertically photographed image and a horizontally photographed image, and
   in a case where the vertically photographed image and the horizontally photographed image mixedly exist in a plurality of images to be printed, said printing information generation means generates printing information causing the top and bottom directions of these images to be matched.

4. An apparatus according to claim 1, wherein, in the case of generating printing information, said printing information generation means reads the additional information using said additional information reading means.

5. An apparatus according to claim 1, further comprising a printer for printing and outputting the image using the printing information.

6. An apparatus according to claim 1, wherein the storage medium is detachably installed in said apparatus.

7. A method of controlling an image reproduction apparatus, comprising:
   an additional information reading step of reading additional information of an image stored in a storage medium;
   an image selection step of selecting, from among the images stored in the storage medium, the image for which printing information is to be generated; and
   a printing information generation step of generating the printing information used for printing the image selected in said image selection step,
   wherein, in a case where specific additional information is included in the additional information read in said additional information reading step, said printing information generation step includes setting the specific additional information in the printing information,
   in a case where the specific additional information is not read, said printing information generation step does not set the specific additional information, and
   in a case where the specific additional information is read, said printing information generation step adds the specific additional information to the printing information for the image selected in said image selection step.

8. A method according to claim 7, wherein the specific additional information is rotation information of the image.

9. A method according to claim 8, wherein the rotation information is information corresponding to a vertically photographed image and a horizontally photographed image, and in a case where the vertically photographed image and the horizontally photographed image mixedly exist in a plurality of images to be printed, said printing information generation step generates printing information causing the top and bottom directions of these images to be matched.

10. A method according to claim 7, wherein, in the case of generating printing information, said printing information generation step includes reading the additional information read in said additional information reading step.

11. A method according to claim 7, wherein the image reproduction apparatus comprises a printer for printing and outputting the image using the printing information.

12. A method according to claim 7, wherein the storage medium is detachably installed in the image reproduction apparatus.

13. A printing information generation method comprising:

an additional information reading step of reading additional information of an image stored in a storage medium;

an image selection step of selecting, from among the images stored in the storage medium, the image for which printing information is to be generated; and a printing information generation step of generating the printing information used for printing the image selected in said image selection step, wherein, in a case where specific additional information is included in the additional information read in said additional information reading step, said printing information generation step includes setting the specific additional information in the printing information, in a case where the specific additional information is not read, said printing information generation step does not set the specific additional information, and in a case where the specific additional information is read, said printing information generation step adds the specific additional information to the printing information for the image selected in said image selection step.

14. A method according to claim 13, wherein the specific additional information is rotation information of the image.

15. A method according to claim 14, wherein the rotation information is information corresponding to a vertically photographed image and a horizontally photographed image, and in a case where the vertically photographed image and the horizontally photographed image mixedly exist in a plurality of images to be printed, said printing information generation step generates printing information causing the top and bottom directions of these images to be matched.

16. A method according to claim 13, wherein, in the case of generating printing information, said printing information generation step includes reading the additional information read in said additional information reading step.

17. A method according to claim 13, wherein the storage medium is detachably installed in the image reproduction apparatus.

18. A storage medium which computer-readably stores a program for realizing a printing information generation method comprising:

an additional information reading step of reading additional information of an image stored in a memory;

an image selection step of selecting, from among the images stored in the memory, the image for which printing information is to be generated; and a printing information generation step of generating the printing information used for printing the image selected in said image selection step, wherein, in a case where specific additional information is included in the additional information read in said additional information reading step, said printing information generation step includes setting the specific additional information in the printing information, in a case where the specific additional information is not read, said printing information generation step does not set the specific additional information, and in a case where the specific additional information is read, said printing information generation step adds the specific additional information to the printing information for the image selected in said image selection step.

* * * * *

UNITED STATES PATENT AND TRADEMARK OFFICE
CERTIFICATE OF CORRECTION

PATENT NO. : 6,825,950 B1
DATED : November 30, 2004
INVENTOR(S) : Atsushi Inagaki It is certified that error appears in the above-identified patent and that said Letters Patent is hereby corrected as shown below:

Column 1,
Lines 17, 21 and 24, "electron" should read -- electronic --.
Line 43, "annoyed" should read -- annoying --.

Column 12,
Lines 41 and 44, "immediate-before" should read -- immediately-preceding --.

Signed and Sealed this

Thirteenth Day of June, 2006

JON W. DUDAS
*Director of the United States Patent and Trademark Office*